United States Patent
Hou et al.

(10) Patent No.: US 8,509,822 B1
(45) Date of Patent: Aug. 13, 2013

(54) HIGHLY SCALABLE, LOWER PRECISION IDLE MODE LOCATING METHOD FOR WIRELESS DEVICES

(75) Inventors: Jiongkuan Hou, Olathe, KS (US);
David Mohan, Overland Park, KS (US);
Kenneth Wayne Samson, Belton, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1971 days.

(21) Appl. No.: 11/655,341

(22) Filed: Jan. 19, 2007

(51) Int. Cl.
*H04W 4/00* (2009.01)

(52) U.S. Cl.
USPC ........... 455/466; 455/456.1; 455/404.2; 455/414.2; 370/401; 370/328; 370/278; 342/357.4

(58) Field of Classification Search
USPC ............ 455/456.1–458, 404.1, 404.2, 414.2, 455/461, 466; 340/426.19, 539.13, 539.11; 379/45, 142.1; 342/357.4; 709/203; 370/352, 370/353, 356, 229, 351, 464, 401, 471
See application file for complete search history.

(56) References Cited

U.S. PATENT DOCUMENTS

| | | | | |
|---|---|---|---|---|
| 6,091,958 A | | 7/2000 | Bergkvist et al. | 455/456 |
| 6,175,743 B1 | * | 1/2001 | Alperovich et al. | 455/466 |
| 6,223,045 B1 | * | 4/2001 | Valentine et al. | 455/466 |
| 6,370,390 B1 | * | 4/2002 | Salin et al. | 455/466 |
| 6,456,854 B1 | | 9/2002 | Chern et al. | 455/457 |
| 6,463,055 B1 | * | 10/2002 | Lupien et al. | 370/353 |
| 6,816,735 B1 | | 11/2004 | Rayburn et al. | 455/456.4 |
| 6,839,023 B1 | * | 1/2005 | Benco et al. | 342/357.4 |
| 6,956,931 B1 | | 10/2005 | Cope | 379/45 |
| 7,031,714 B1 | | 4/2006 | Rayburn | 455/445 |
| 7,092,722 B1 | | 8/2006 | Oh et al. | 455/456.1 |
| 7,130,641 B1 | | 10/2006 | Al-Khashti et al. | 455/456.1 |
| 7,142,874 B1 | | 11/2006 | Oleniczak | 455/456.3 |
| 2003/0125042 A1 | * | 7/2003 | Olrik et al. | 455/456 |
| 2004/0087305 A1 | * | 5/2004 | Jiang et al. | 455/432.1 |
| 2004/0106413 A1 | | 6/2004 | Sambin | 455/456.1 |

(Continued)

FOREIGN PATENT DOCUMENTS

| | | |
|---|---|---|
| EP | 1148754 | 10/2001 |
| EP | 1248484 | 10/2002 |

(Continued)

OTHER PUBLICATIONS

Collesei et al., "Short Message Service Based Applications in the GSM Network", Conference: 5$^{th}$ IEEE International Symposium on Personal, Indoor and Mobile Radio Communications, vol. 3, pp. 939-943 (Sep. 18-23, 1994).

Papadoglou et al., "Providing Location Information from GPS through the GSM-Short Message Service for the Use of an AVL System", Conference: Proceedings of First International Symposium on Communication Systems and Digital Signal Processing, vol. 1, pp. 176-180 (Apr. 6-8 1998).

(Continued)

*Primary Examiner* — Mahendra Patel (57) ABSTRACT

Methods of determining and providing location information as to the whereabouts of a wireless device are disclosed which have less geographical precision that those based on GPS or triangulation algorithms, but which are much more scalable, efficient and less costly. The methods make use of SMS paging and in particular obtain cell and cell sector information from a wireless device from a response message to an SMS page to the device. The cell and cell sector is converted to user-friendly geographical information such as an address or name of a building using a database correlating cell sectors to landmarks, location or addresses, and this user-friendly information is returned to the requestor.

18 Claims, 3 Drawing Sheets

(56) References Cited

U.S. PATENT DOCUMENTS

| | | |
|---|---|---|
| 2004/0116128 A1 | 6/2004 | Chen .......................... 455/456.1 |
| 2004/0166879 A1 | 8/2004 | Meadows et al. .......... 455/456.1 |
| 2004/0203901 A1 | 10/2004 | Wilson et al. ............. 455/456.1 |
| 2005/0064877 A1* | 3/2005 | Gum et al. ................. 455/456.1 |
| 2005/0202817 A1 | 9/2005 | Sudit ............................ 455/433 |
| 2005/0277427 A1 | 12/2005 | Zhang ........................ 455/456.1 |
| 2006/0040678 A1 | 2/2006 | Kwon ......................... 455/456.3 |
| 2006/0135157 A1* | 6/2006 | Baek et al. ................... 455/433 |

FOREIGN PATENT DOCUMENTS

| | | |
|---|---|---|
| WO | WO 9625830 | 8/1996 |
| WO | WO 0128271 | 4/2001 |
| WO | WO 2004105295 | 12/2004 |
| WO | WO 2005060280 | 6/2005 |

OTHER PUBLICATIONS

Griffith et al., A Method for Providing Mobile Location Service in GSM-Based Network Using Packet Data and Short Message Service, Motorola disclosure Jun. 1, 1999.

Krishhnamurthy, "Using SMS to Deliver Location-Based Services", Conference: 2002 IEEE International Conference on Personal Wireless Communications, pp. 177-181 (Dec. 15-17 2002).

Ravi Jain et al., "The Mobile Application Server (MAS): An Infrastructure Platform for Mobile Wireless Services", Information Systems Frontiers, vol. 6, No. 1, pp. 23-24 (Mar. 2004).

Bamford et al., "Location-Based Mobile Blogging", Conference: International Conference on Information & Communication Technologies: from Theory to Applications, IEEE p. 6 (Apr. 24-28 2006).

* cited by examiner

HIGHLY SCALABLE, LOWER PRECISION IDLE MODE LOCATING METHOD FOR WIRELESS DEVICES

BACKGROUND

A. Field

This invention relates generally to the field of wireless telephony and more particularly to methods of determining the geographic location of a mobile telephone and providing such location information to a user, computer application, or other source requesting the information.

B. Related Art

The art of wireless telephony has developed various methods for determination of the location of a wireless telephone. Some methods analyze the signals exchanged between the telephone and base station antennas in the wireless network. Other methods make use of Global Positioning System (GPS) chips which are included in the wireless telephone and the transmission of GPS data from the telephone to a network node. In the art, such techniques result in relatively high precision determination of the location of the wireless telephone, often to within an accuracy of a hundred feet or even less.

High precision location determination capabilities, such as described above, are used for a variety of purposes, including directing a response to an emergency 911 (E-911) call placed by the wireless phone, and providing location-based services to the user of the wireless phone. Examples of the determination and use of a location of a wireless telephone are set forth in the following patent documents, all of which are assigned to the assignee of this invention: U.S. Pat. Nos. 7,142,874; 7,130,641; 7,092,722; 7,031,714; 6,956,931 and 6,816,735. Other prior art of interest includes Bergkvist, et al., U.S. Pat. No. 6,091,958; Olrick et al., U.S. Patent application publication 2003/0125042; Published PCT application WO 2004/105295, published European Patent Application EP 1,248,484 and Nandini Krishnamurthy et al., *Using SMS to deliver location-based services*, 2002 IEEE International Conference on Personal Wireless Communications, Dec. 15-17 2002, pp. 177-181.

The use of location information in the wireless telephone art for these and other purposes has been growing at an extremely rapid rate. The present inventors have realized that high precision wireless telephone location systems are difficult and expensive to scale to the levels needed to satisfy the demand for location determination. This is due to several factors, including the fact that many wireless telephones, particularly older ones, do not have GPS chips in them and thus more time consuming and expensive methods must be used, the ever growing number of wireless telephones in use, and the ever increasing number of uses and applications for wireless telephone location.

One example of the use of high precision location information is so-called "idle mode location query" (IMQ), which refers to the scenario where one user (user A) wants to pinpoint the location of another user (user B) whose mobile handset is in idle mode. Idle mode means the mobile handset is powered on, but not engaged in any active voice or data session. In current practice, User A can initiate a location request through a mobile service provider's web site or a specially designed enterprise application server which is connected to the service provider's network via a Virtual Private Network. When the service provider's location platform receives the location request, it will first wake up the GPS chipset of the target handset (user B's handset) and then set up a location session with the handset. After the position of the target handset is calculated (through GPS or network based location technology such as Advanced Forward Link Trilateration (AFLT) (a location method based on signal measurements), the location platform returns the results back to User A.

IMQ capability is a significant business driver for wireless service providers. It has been widely used by both commercial and enterprise users. For example, a mother may want to find out whether her son has arrived at school and uses IMQ to determine whether the son is at the location of the school. As another example, a taxi company manager wants to know the location of a cab and uses the above method to locate the cell phone used by the cab driver. The current IMQ solution described above, however, has the following shortcomings:

The target handset (the handset to be located) has to have an embedded GPS chip if GPS technique is to be used.

The target handset must be IMQ capable (i.e. the handset GPS chip must be able to be woken up by a network message).

The IMQ location request, just like the handset initiated location request, requires a location session to be established between the handset and the location platform. The session usually lasts 20 seconds. Such a location procedure consumes a lot of network resources at the location platform, Mobile Switching Centers (MSCs) and air interface resources. With the explosive increase in the demand for IMQ location services, the capacity issue will escalate in severity in the foreseeable future.

Preferred embodiments of this invention make use of Short Message Service (SMS) messaging. SMS is a known means by which short (up to 160 characters) alphanumeric messages can be sent to and from digital cell phones, pagers and other hand=held wireless devices. SMS is defined in the international standards document IS-41C. An outline of SMS is described in Gallagher et al., *Mobile Telecommunications Networking with IS*-41, chapter 13, McGraw-Hill Series on Telecommunications (1997). SMS is basically a store and forward method for delivering SMS messages to mobile terminals. Generally, when a network entity (which could also be a mobile device) sends an SMS message, the message gets sent as an "SMPP" message to an SMS router, which delivers the message as an SMPP message to an SMS Center (SMSC) based on the destination party's number indicated in the message. In particular, the SMS router in queries a network entity to find out which SMSC serves the destination and then sends the message to the serving SMSC. The SMSC will then query a home location register (HLR) to find out which mobile switching center (MSC) currently serves the terminating mobile station, and will send the SMS message to that switch in an "SMDPP" message. The MSC then pages the mobile station by transmitting a general page message, and the MSC receives a general page message response from the mobile station, indicating the mobile station's serving cell/sector. The MSC then delivers the SMS message to the mobile station via the base transceiver station that operates the indicated serving cell/sector. Further, the MSC sends an smdpp_rr (an SMDPP return result or acknowledgement) message to the SMSC to acknowledge message delivery.

This invention meets a need in the art for a method for locating a wireless telephone but in a more scalable, cost effective and efficient manner than the high precision methods using GPS or triangulation methods. The methods of this invention may not have the high precision of GPS or triangulation algorithms currently used in E-911 services, but the lower precision location is still more than adequate for many other applications.

One aspect of this invention is directed to an SMS-based relatively low precision IMQ solution which is able to resolve all the above mentioned issues by offloading some of the location requests (those where lower precision is acceptable) from the high precision location platform to SMS infrastructure of a wireless service provider network.

SUMMARY

In one embodiment, a method for locating a wireless device includes a step of receiving a request for the location of a wireless device from a requester (which may be a human or a machine-generated request). In response to the request, an SMS message is generated and sent to a mobile switching center which pages the wireless device. A response message is received from the wireless device. The response message contains cell and cell sector information which indicates where the wireless device is currently registered and located. The cell and cell sector information from the response is converted into useful geographical information, such as latitude and longitude, an address (e.g., Fourth and Pine), building name (Husky Stadium, Bloomingdale's on State Street, the Wrigley Building etc.), or facility (e.g., Grant Street Elementary School) which is covered by the cell and cell sector identified in the response message. This geographical information is then forwarded on to the requester.

In another embodiment, a method of locating a wireless device includes steps of receiving a request for the location of a wireless device from a requester, in response to the request, paging the wireless device; receiving a response to the paging from the wireless device, the response containing cell and cell sector information, converting the cell and cell sector information from the response into geographical information; and forwarding the geographical information to the requester.

In yet another aspect, a method of determining the geographic location of a wireless device is disclosed which includes steps of a) receiving a request for location information from a requestor; and b) determining whether to use a high precision method or a low precision method to determine the location. If step b) results in a high precision method, the request is forwarded to a high precision location determination system. If step b) results in a low precision method, then the method continues with steps of 1) generating an SMS message; 2) forwarding the SMS message to an MSC currently serving the wireless device; 3) paging the wireless device; 4) receiving a response to the page containing cell and cell sector information; 5) converting the cell and cell sector information to geographical location information; and 6) forwarding the geographical location information to the requestor.

In still another aspect, a method is described of determining the geographic location of a wireless device, comprising the steps of: a) receiving a request for location information from a requestor; b) determining whether the requester is authorized to determine the location of the wireless device, c) if step b) is negative generating an error message and if step b) is positive, determining whether to use a high precision method or a low precision method to determine the location. If a high precision method is determined in step c), the method continues with sending the request to a high precision location platform. If a low precision method is determined in step c), the method continues with determining the location using a page response to an SMS page of the wireless device.

These as well as other aspects, advantages, and alternatives will become apparent to those of ordinary skill in the art by reading the following detailed description with reference where appropriate to the accompanying drawings.

DETAILED DESCRIPTION

Short Message Service (SMS) messaging capability and infrastructure of a wireless service provider network can be used to not merely convey location information but actually used to automatically locate a wireless device in the first place to a reasonable degree of precision, without any involvement of the user of the wireless device. The method takes advantage of the fact that in SMS messaging, as explained above, the serving switch (MSC) obtains low-precision location information of the mobile station in response to a page message, namely, the cell and cell sector of the base transceiver station that forwarded the SMS message to the wireless device. While this is relatively low-precision location information, as compared with high-precision location that can be determined through use of GPS or triangulation algorithms, it is still adequate in many situations. Whereas in the prior art the MSC normally deletes the cell and cell sector information after it receives in the page response message, embodiments of this invention make use of such cell and cell sector information to respond to location request messages by converting the cell and cell sector information into user-friendly location information, such as street address or building information, and passing the user-friendly location information on to the entity or person that initiated the request.

In methods of this disclosure, the existing SMS messaging process is leveraged to obtain relatively low-precision location of the mobile station, for use to support location-based services or provide location information in response to requests for location information. This invention achieves a goal of determining location in a way that is far more efficient, scalable and cost effective than querying a high precision location platform every time to determine the mobile station's location. It also does not require that mobile station have any location determination equipment, such as a GPS receiver. Virtually all mobile telephone devices on the market today have a capability of handling SMS messages, so the methods are generally not limited to only a small subset of the population of wireless devices in use, as in the case of GPS-based methods.

Furthermore, a high precision location-determination platform can be limited in the number of location requests that it can handle per busy second. For instance, it might be limited to about 15 high-precision location requests per busy second. On the other hand, a standard SMSC may be able to process about 3,000 SMS message requests per second, and thus may be able to process 3,000 low-precision location requests per second using the methods of this disclosure. The SMS infrastructure of wireless networks is abundant in capacity, easily upgradeable, and scalable. Additionally, since the SMS system is a transaction-based service instead of session-based, SMS-based location request queries consume less network resources than high precision location platform based methods.

Figure 1:
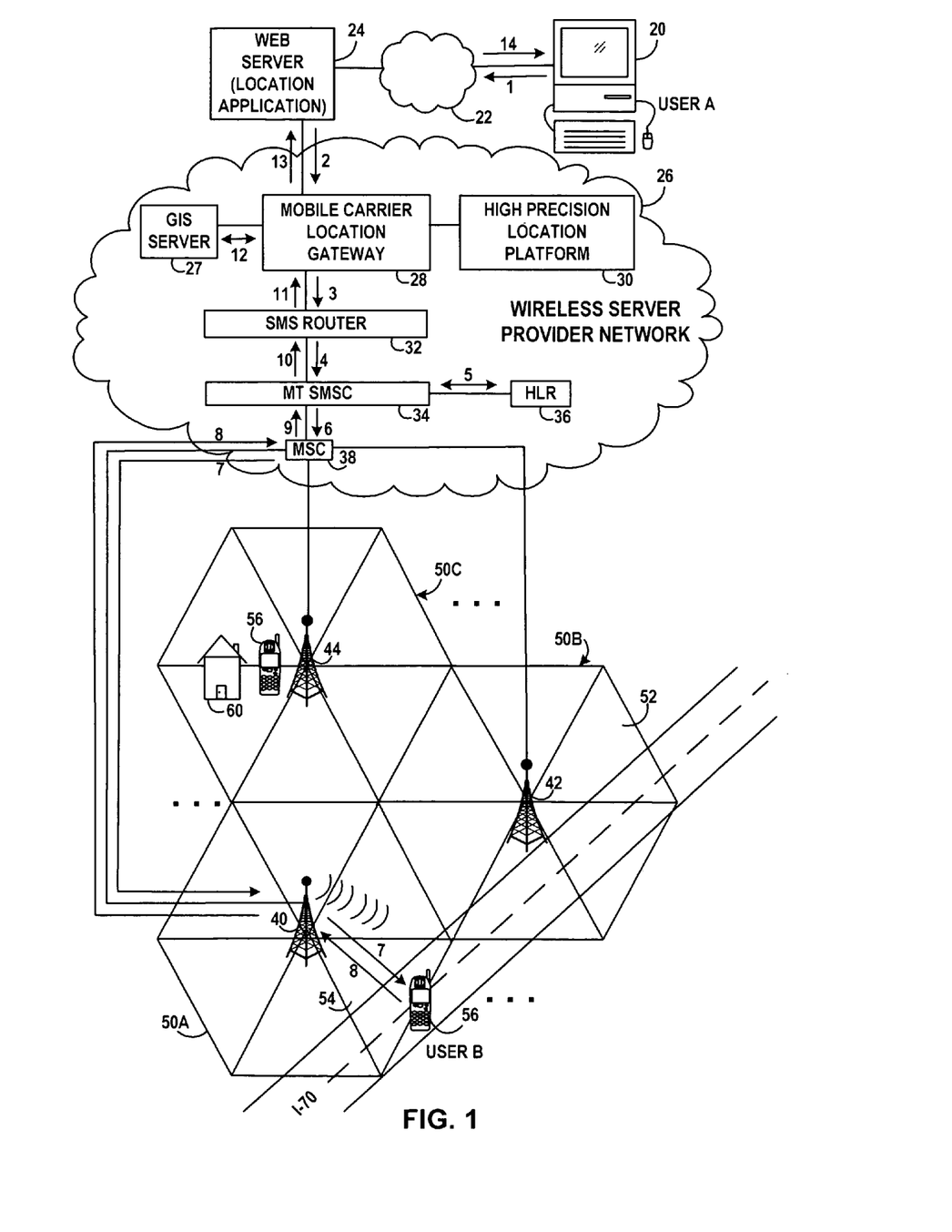
FIG. 1 is an illustration of a wireless communications network including the elements of an SMS messaging infrastructure which can be used to practice one embodiment of the invention.

With reference now to FIG. 1, consider the situation where a User A operating a computer or other type of terminal 20 wishes to know the location of User B which operates a wireless device 56 such as a cellular phone, pager, personal digital assistant or other portable wireless device. The user A terminal 20 has access to the Internet 22 and can exchange data with a server 24 such as a web server which is operated and maintained by a wireless service provider and hosts the web site of the wireless service provider. The server 24 could also be specially designed enterprise application server which is connected to the service provider's network 26 via a Virtual Private Network. The web server 24 serves pages to the user A 20 include pages which are part of a location application, basically providing a means for receiving and responding to requests for location of subscribers of the wireless service provider.

The server 24 is connected to the wireless service provider network 26 as indicated in FIG. 1. The network 26 includes various nodes, including a mobile carrier location gateway 28 which is responsible for processing location requests from the server 24 and providing location response messages containing location information to the server 24. The network 26 also includes an optional Geographic Information System (GIS) server 27 which contains a database correlating cell and cell sector information into geographical information, such as for example latitude and longitude coordinates of the center of each cell sector. (Note that the "location" of a cell sector could be represented in various ways, two of which are (i) the location of the point of origin of the cell sector, namely the location of the cell tower, and (ii) the location of a centroid of the cell sector, assuming some knowledge exists as to the scope of coverage of the cell sector. The "location" of the cell sector could be defined in advance in whatever way is desired.) Alternatively, the database 27 could map cell and sectors to user-friendly geographical information, such as address, building name, landmark, or other information which is greater interest to the user A than cell and cell sector or latitude and longitude. (See FIG. 3 and the discussion below).

The network 26 further includes a high precision location platform 30 (also known in the art as a Position Determination Entity or PDE) which determines location of wireless devices using high precision methods such as GPS or AFLT methods. The methods of this disclosure provide an alternative way of determining location to the methods used by the high precision location platform 30. The goal of this disclosure is not necessarily to replace the high precision location platform 30, as it should be used in appropriate circumstances such as in the case of emergency 911 calls or like situations, such as when a request for location is made to a user who is known to be lost such as an overdue mountain climber. Rather, this disclosure provides a scalable alternative method that complements the existing high precision based mobile location platform and off-load location requests in appropriate circumstances to SMS infrastructure. The methods of this disclosure provide a low precision location fix, i.e. the mobile device is somewhere in a given cell and cell sector but no greater geographical precision is available. However, this level of precision or geographic resolution is good enough for many applications. For example, a mother knows that her son is at school if his handset is being serviced by the cell and cell sector that covers the school area. She does not care whether he is in one particular wing of the school or another, or out on the playground. As long as she knows that he is at school, she is satisfied. Countless other examples exist where location information is desired but GPS accuracy is not required. Hence, this invention.

When the mobile carrier location gateway 28 receives a location request that is suitable for lower precision response, the SMS infrastructure of the wireless network is invoked. This infrastructure includes an SMS router 32, a mobile terminated SMS center (MT SMSC) 34, and a home location register (HLR) 36. The operation of the SMS router 32, MT SMSC 34 and HLR 36 will be discussed in detail below. The HLR tells the MT SMSC which switch (MSC) in the wireless network is currently serving a given wireless device. The MSC sends an SMS paging message a set of base transceiver stations 40, 42 and 44 (and still others). When the user B wireless device 56 responds to the page, a message is returned to the MSC 38 which includes a field containing data which identifies the cell and cell sector that the device 56 is currently in.

In particular, the wireless network includes base transceiver stations 40, 42, 44, etc. which send and receive messages over a geographic region referred to as a cell, and which is shown as a hexagon 50A, 50B, 50C in FIG. 1. Each hexagon consists of individual sub-sections known as cell sectors 52, 54. The use of hexagons to represent cells and pie-shaped regions for cell sectors is conventional in the art but in practice the cells and cell sectors can have other configurations, depending on such matters as terrain, presence of buildings or foliage, etc. In the example of FIG. 1, the user B device 56 is located in sector 54 of the cell for base transceiver station 40. The user-friendly geographic location for this particular cell and sector is a location along Interstate 70, such has for example I-70 at mile marker 202, or I-70, 4 miles west of the Colorado Boulevard exit. In practice, the cell sector covers more than just that exact location, but some location, such as for example the center of the cell sector, or the prominent feature of the cell sector, such as a major interchange or intersection of Interstate 70 within the cell, is chosen to represent the location of this cell sector. In one embodiment a GIS server 27 accesses a database which correlates every cell and sector to a user-friendly geographical descriptor for the cell and sector (either at the center, or some landmark covered by the cell and sector). In another embodiment, the GIS server correlates each cell sectors to a latitude and longitude coordinate, and provides that location coordinate to the location application in the web server 24 which in turn accesses a database which associates a latitude and longitude coordinate to a user-friendly geographical landmark or region ("Jefferson county library", "University of Chicago", "Soldier Field", etc.).

The operation of one exemplary embodiment of the method will be described now in relation to FIG. 1 and the arrows 1 . . . 14 which indicate particular messages exchanged between the various entities. The numbers below correspond to the numbers 1 . . . 14 of FIG. 1.

1. User A launches a location application (via a wireless handset or computer 20), submits a request to locate User B (mobile telephone 56) to the web server 24 of FIG. 1. (It will be noted that the source of the location request is not particularly important and the initial request could be generated automatically by a computer or a network node, or by a human, and the details are not important).
2. The request from User A is forwarded to the mobile carrier's location gateway 28.
3. The mobile carrier location gateway 28 determines whether to send the location request to the high precision location platform 30 or whether to use a lower precision location method using the SMS infrastructure of the wireless network. The mobile carrier executes logic that coded such that if a. This is a low precision location request, and
b. User A is authorized to locate user B, and
c. User B handset is SMS capable, then the location gateway 28 submits a specially coded SMS message to the SMS router 32.

High precision requests, such as E-911 requests, etc. will be forwarded to high precision location platform 30 following existing Idle Mode Location Query procedures. The method for determining whether a request is a low precision request (a. above) can take a variety of forms, such as by using a default that all requests other than E911 requests are low precision, by having the initial request message 1 specify whether it is low or high precision, etc. The question of authorization (b. above) can be handled in a variety of methods, see the discussion below. The question of whether user B handset is SMS capable (c. above) can be done by reference to a user profile containing information about user B and their mobile device, such as the make and model of the device and information as to its features, capabilities, services that it has signed up for, etc.

The specially coded SMS message generated at 3 contains predefined content and a return receipt request field. The message may be specially coded by including a "TELESERVICE_ID", which is a code that indicates the SMS message is a particular special type of SMS message. The content of the SMS message may be as simple as "User B- you have been located", or "User B someone has requested to know your location," or "User B, User A has requested to know your location."

Figure 3:
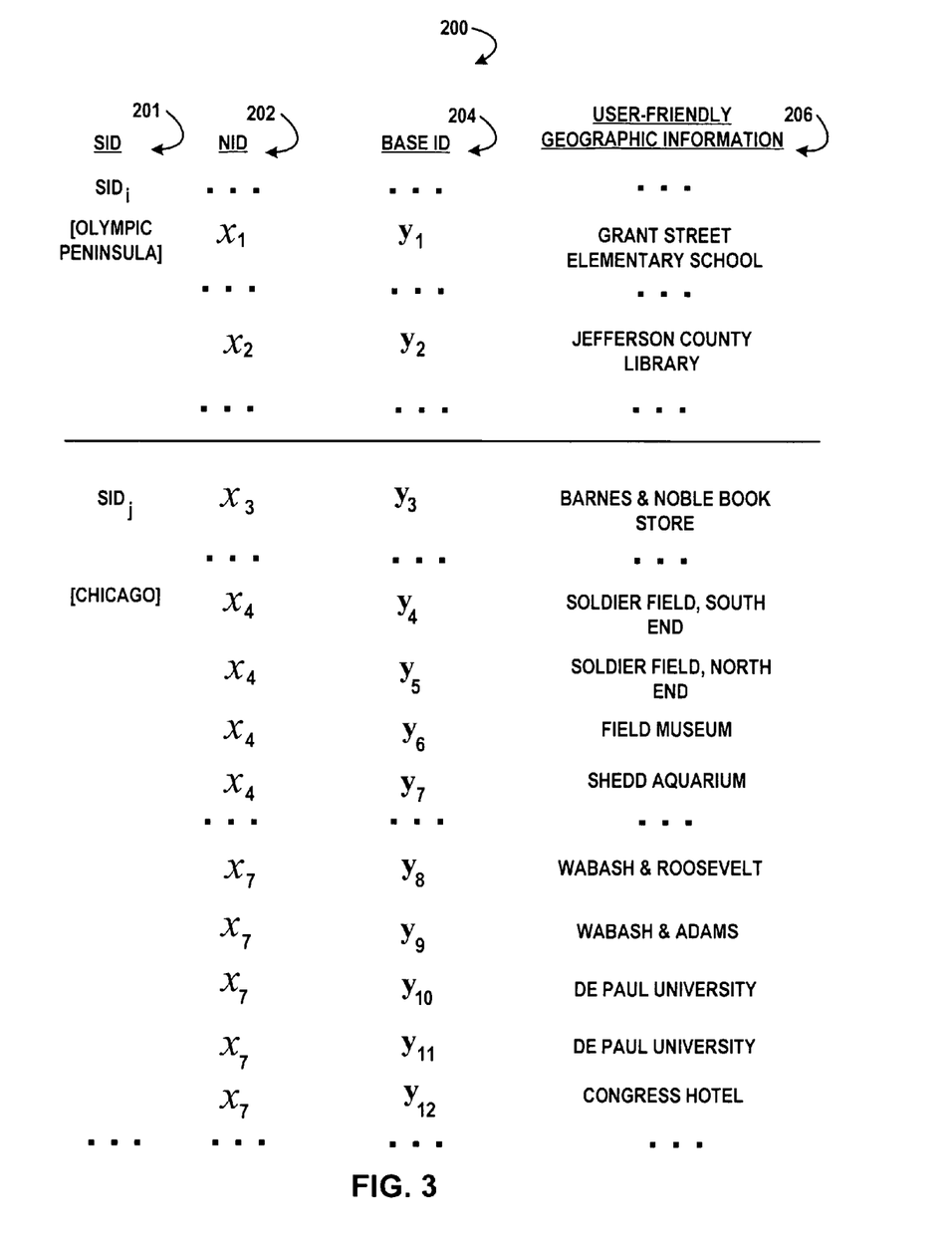
FIG. 3 is one possible embodiment of a database that correlates cell sectors in a wireless network to user friendly location information.

4. The SMS router 32 directs the message to the MT SMSC 34 that serves User B's handset.
5. The MT SMSC 34 queries the HLR 36 to identify the serving MSC 38 for the user B handset.
6. The MT SMSC 34 forwards the message to serving MSC 38 via the SMDPP method.
7. The MSC 38 pages the user B handset 56, as it does with a typical SMS message.
8. The User B handset 56 responds to the page with a page response message containing cell/sector information (SID, NID, BaseID) of the serving cell sector. In particular, the response to the page will include a section identification (SID) code, which uniquely identifies a given geographic market, such as a state, city or region, within the service provider's territory, a NID code which identifies a unique particular mobile switching center (MSC) in the region defined by the SID code, and a Base station ID (Base ID) which identifies the particular base transceiver station cell and sector that communicated with the User B phone device and which is in the area served by the MSC identified in the NID code.
9. The MSC 34 sends the cell/sector (SID, NID, BaseID data) back to MT SMSC 34 via an smdpp[ACK] (return result) message.
10. The MT SMSC 34 generates a "message delivery receipt" message using (SID, NID, BaseID) as content and sends it to the SMS router 32.
11. The SMS router 32 sends the "message delivery receipt" back to Location Gateway 28.
12. The location gateway 28 extracts the cell and sector information (SID, NID, BaseID) from the delivery receipt, and sends it the GIS (Geographical Information System) server 27 to map the (SID, NID, BaseID) into lat-long coordinates. Alternatively, the geographical information system could map cell sectors to user friendly geographical locations, such as shown in FIG. 3.
13. The location gateway 28 sends the Lat-Long coordinates back to the location application server 24.
14. The location application server 24 may further process the location result, e.g. covert the coordinates to a point or circle (region) on a digital map, and presents the result to User A. Alternatively, the location server 24 could also convert the latitude and longitude coordinates to a useful landmark such as building, park, school, or other format, that is close to or encompassed by the latitude and longitude coordinates and advise user A of the landmark. For example, if User A is a mom asking the location server 24 where her son (user B) is located, the location server could interpret the latitude and longitude coordinates as those corresponding to the location of the Grant Street Elementary School grounds an replies to User A "the person is located at the Grant Street Elementary School."

Figure 2:
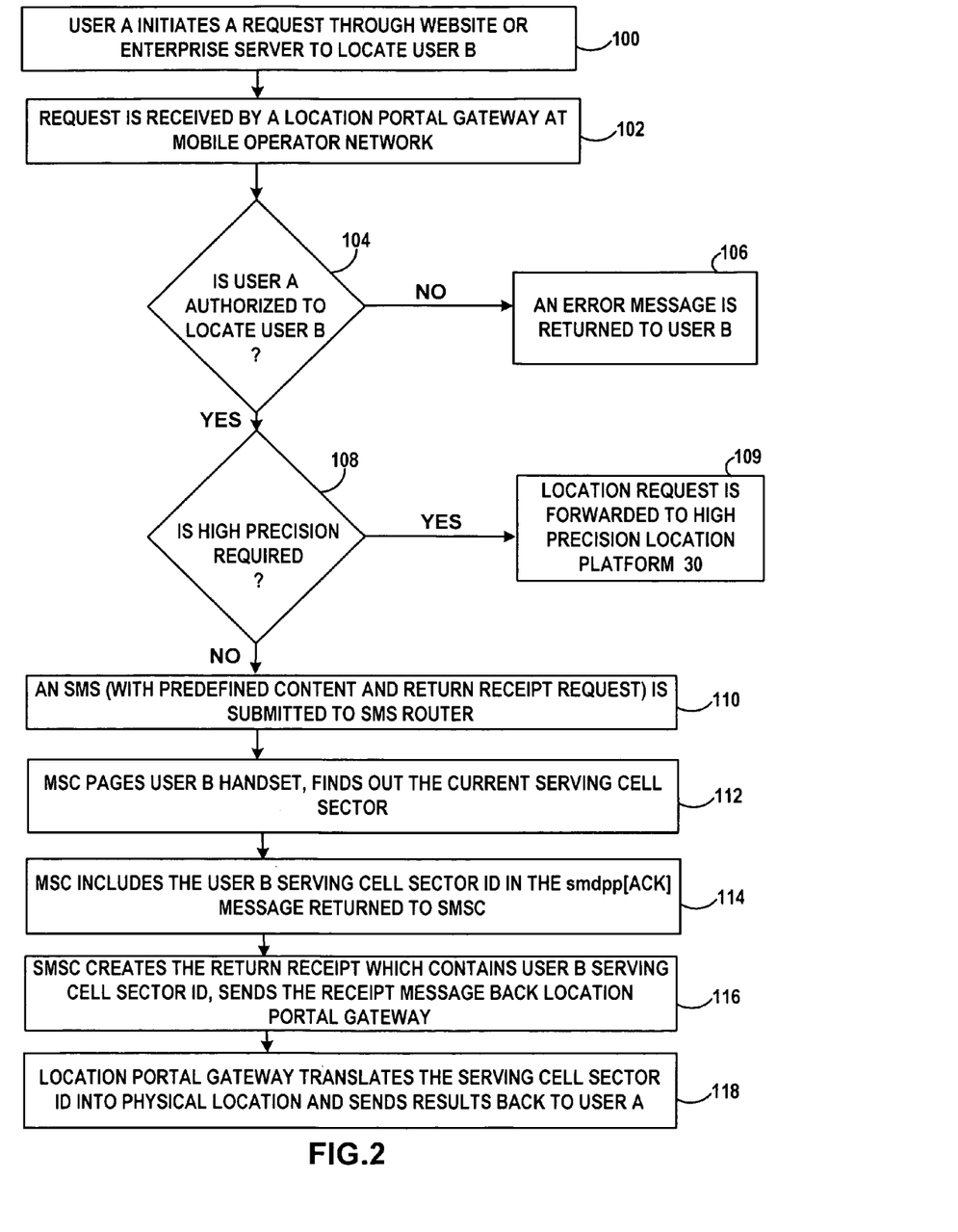
FIG. 2 is a flow chart showing the processing steps in another embodiment of the invention.

FIG. 2 shows in flow chart form an alternative implementation of the method. Reference will also be made to FIG. 1 in the following discussion.

In FIG. 2, at step 100, the user A initiates a request through a website or enterprise server to locate user B (similar to step 1 above). Again, the initial request could come from any of a number of sources, and need not be that of a human user, i.e., it could be generated by a computer such as a law enforcement computer or an application server providing location-based services.

At step 102, the request is received by the location portal gateway 28 at the mobile operator network 26 (similar to step 2 above).

At step 104, the gateway 28 determines whether user A is authorized to locate user B. For example, User B can specify a limited set of persons (such as their family members only) which are authorized to obtain location information to preserve their privacy. The gateway 28 can determine whether user A is authorized by means of user name and password to confirm the identity of User A as authorized, or by any other convenient means. The system could be set such that law enforcement agencies are authorized to obtain location information.

If at step 104 the user A is not authorized, then an error message is returned as indicated at step 106.

If at step 104 the user A is authorized, then the processing proceeds to step 108. At this step, the gateway 28 determines whether the request is one which requires high precision location, e.g., using GPS or triangulation techniques. Again, this could be specified by the requestor, or defaults could be used. If high precision is required, the processing proceeds to branch 109 and the location request is forwarded to the high precision location determination platform.

If at step 108 high precision is not required, at step 110 an SMS with predefined content and return receipt request is submitted to the SMS router 32. The SMS router forwards the SMS message with the MT SMSC 34 and it obtains the serving MSC identification from the HLR 36 of FIG. 1.

At step 112 the SMS message is forwarded to the serving MSC 38 which then pages the user B wireless device. The MSC 34 obtains the current serving cell sector for User B device in the response to the paging message.

At step 114, the MSC 34 includes the user B serving cell sector ID in an smdpp[ACK] message which is returned to the MT SMSC 34.

At step 116, the SMSC 34 creates a return receipt message which contains the User B serving cell sector identification, and sends the receipt message back to the location portal gateway 28.

At step 118, the location portal gateway 28 translates the serving sector identification into a user-friendly location (either lat/long., building, street address, landmark or other useable form of geographic information) and sends the results to the location application 24 which then forwards the results back to user A. Alternatively, the location application converts latitude and longitude data to user friendly location information and provides the results to user A.

It will noticed in this embodiment that the translation of cell sector to user-friendly location information can be done in the mobile carrier location gateway and need not involve a separate server (GIS server 27 in FIG. 1), and it need not be performed in the location application server 24.

FIG. 3 shows an example of a database 200 that converts cell sector information to useful geographical information. The database 200 could be accessed or maintained by the GIS server 27 of FIG. 1, the location gateway 28 or the location application/web server 24 depending on how the invention is implemented. One column 201 lists all the SID's of the wireless service provider, two of which are shown for example, one covering the Olympic Peninsula marked and another covering the Chicago market. Column 202 lists the NID for the switches in the given market for column 11, where X1 and X2 are some digit or code which uniquely identifies a given switch. Column 204 lists the base IDs which are unique assigned to a base stations cell sector within the area served by the MSD identified in column 202. Column 206 contains user-friendly geographical information for each of the cell sectors in the column 204, such as "Grant Street Elementary School" for SID, $NID_{x1}$ and Base $ID_{y1}$ (see building 60 in FIG. 1), "Jefferson County Library" for SID, $NID_{x2}$ and Base $ID_{y2}$ etc. As indicated in FIG. 3, more than one cell sectors may have the same geographic information (see $SID_j$, $NID_{x7}$, $SID_{y10}$ and $SID_{y11}$).

As noted above, the column 206 could instead contain only latitude and longitude information for each sector, and the translation of latitude and longitude information to geographic landmarks such as schools, intersections, hotels, etc. could be performed in a separate platform, such as the location application server 24 of FIG. 1, the gateway 28 or even in the workstation of the requesting user.

Privacy Considerations

As a further feature, the methods of this invention could account for user B's location privacy, by notifying user B about the location determination request itself and/or or the fact that location information has been sent. For instance, after the MSC 38 pages user B, the location gateway 28 may generate and send directly to user B an SMS message that includes a text notification indicating that user B's cell sector location has been determined. In fact, to simplify things, this could be part of the content of the SMS message or page message that is sent in the first place (item 7 in FIG. 1). Further, the MSC 38 can condition sending of the cell sector ID in its smdpp_rr (item 9 in FIG. 1) upon successfully receiving an ACK, approval, or other confirmation from user B's mobile station confirming that user B's mobile station received the notification and thus that user B has been put on notice about the location determination and approves of providing the location information to User A . . . .

Other Messaging Formats

Theoretically, the location gateway 28 can translate a low precision location request (item 2 in FIG. 1) into any one of several different notification messages including SMS, incoming MMS, WAP push, or voice mail for transmission to the MSC 38 to acquire low precision location information. However, when such a message arrives at the serving MSC 38, the MSC 38 will use the same paging method to find out the serving cell sector of the target handset. In other words, starting from MT SMSC (step 6 in FIG. 1), they will all follow the same call flow. An SMS message is believed to be the best candidate for transmission at step 3 of FIG. 1 because SMS is light weighted, and it will not involve other network components outside of the SMS platform (MT SMSC 34 and SMS router 32). It is considered better to keep all the messages within the SMS platform due to the fact that SMS platform is very scalable. Also, other methods may not require the MT SMSC 34 to generate a delivery receipt. As indicated previously, the delivery receipt containing the cell and sector information for the target handset is a mechanism for returning the location information to the location gateway and thus in some embodiments is an important part of carrying out this invention. Nevertheless, other messaging formats are possible for use with this invention.

While a number of exemplary aspects and embodiments have been discussed above, those of skill in the art will recognize that certain modifications, permutations, additions and sub-combinations thereof are also being present in the disclosure. It is therefore intended that the following appended claims and claims hereafter introduced are interpreted to include all such modifications, permutations, additions and sub-combinations as are within their true spirit and scope.

We claim:

1. A method using SMS and paging messages to facilitate reporting a location of a wireless device, comprising:
a node in a network receiving an SMS message for delivery to the wireless device;
in response to receiving the SMS message, the node (i) sending a general page message to the wireless device and as a result of sending the general page message, the node receiving a general page message response indicating a cellular coverage area in which the wireless device is located and then (ii) transmitting the received SMS message to the wireless device in the cellular coverage area indicated by the general page message response, wherein the SMS message contains a message selected from the group consisting of (a) a message indicating that the wireless device has been located, (b) a message indicating that the location of the wireless device has been requested, and (c) a message indicating that the location of the wireless device has been requested by the requester;
translating the cellular coverage area indicated by the general page message response into geographic information; and
outputting the geographic information for delivery to a requester.

2. The method of claim 1, wherein the node comprises a mobile switching center (MSC).

3. The method of claim 1, wherein the cellular coverage area comprises a cell and a cell sector.

4. The method of claim 1, wherein the cellular coverage area comprises a cell sector.

5. The method of claim 1, wherein the general page message response includes a base station ID that identifies the cellular coverage area.

6. The method of claim 1, wherein translating the cellular coverage area indicated by the general page message response into geographic information is carried out by a second node comprising a mobile carrier location gateway.

7. The method of claim 1, wherein translating the cellular coverage area indicated by the general page message response into geographic information is carried out by a second node comprising a geographic information system.

8. The method of claim 1, wherein the geographic information comprises information selected from the group consisting of (i) latitude and longitude coordinates and (ii) a landmark.

9. The method of claim 1, further comprising:
before translating the cellular coverage area indicated by the general page message response into geographic information and outputting the geographic information for delivery to a requester, the node obtaining approval from the wireless device to report the location of the wireless device.

10. A method using SMS and paging messages to facilitate reporting a location of a wireless device, comprising:
a node in a network receiving, from a requester, a request for the location of the wireless device;
in response to receiving the request, the node generating and sending an SMS message for delivery to the wireless device;
a mobile switching center (MSC) in the network receiving the SMS message;
in response to receiving the SMS message, (i) the MSC sending a general page message to the wireless device and as a result of sending the general page message, the MSC receiving a general page message response indicating a cellular coverage area in which the wireless device is located and (ii) the MSC then transmitting the received SMS message to the wireless device in the cellular coverage area indicated by the general page message response, wherein the SMS message contains a message selected from the group consisting of (a) a message indicating that the wireless device has been located, (b) a message indicating that the location of the wireless device has been requested, and (c) a message indicating that the location of the wireless device has been requested by the requester;
the MSC further forwarding an indication of the cellular coverage area indicated by the general page message response to the node, for use in providing the location of the wireless device to the requester; and
the node receiving the indication of the cellular coverage area forwarded by the MSC and in response to receiving the indication of the cellular coverage area, the node (i) translating the cellular coverage area into geographic information and (ii) outputting the geographic information for delivery to the requester.

11. The method of claim 10, further comprising:
in response to receiving the request, the node determining whether the request can be processed by a low precision location method; and
in response to determining that the request can be processed by the low precision location method, the node generating and sending the SMS message for delivery to the wireless device.

12. The method of claim 10, wherein the requester comprises a second node selected from the group consisting of a computer and a server, and wherein the request is generated automatically by the second node.

13. The method of claim 10, wherein the requester comprises a human, and wherein the request is generated by a terminal on command of the human, wherein the terminal is selected from the group consisting of a wireless handset and a computer.

14. A system comprising:
a mobile switching center (MSC) configured to (i) receive an SMS message for delivery to a wireless device, (ii) in response to receiving the SMS message, (a) send a general page message to the wireless device and as a result of sending the general page message, receive a general page message response indicating a cellular coverage area in which the wireless device is located, and then (b) transmit the received SMS message to the wireless device in the cellular coverage area indicated by the general page message response, and (iii) forward an indication of the cellular coverage area indicated by the general page message response, for use in providing the location of the wireless device to a requester; and
a node configured to (i) receive the indication of the cellular coverage area, (ii) translate the cellular coverage area into geographic information, and (iii) output the geographic information for delivery to the requester,
wherein the SMS message contains a message selected from the group consisting of (i) a message indicating that the wireless device has been located, (ii) a message indicating that the location of the wireless device has been requested, and (iii) a message indicating that the location of the wireless device has been requested by the requester.

15. The method of claim 10, wherein the geographic information comprises information selected from the group consisting of (i) latitude and longitude coordinates and (ii) a landmark.

16. The system of claim 14, wherein the geographic information comprises information selected from the group consisting of (i) latitude and longitude coordinates and (ii) a landmark.

17. The method of claim 10, further comprising:
before forwarding the indication of the cellular coverage area to the node, the MSC obtaining approval from the wireless device to forward the indication of the cellular coverage area.

18. The system of claim 14, wherein, the MSC is further configured to, before forwarding the indication of the cellular coverage area, obtain approval from the wireless device to forward the indication of the cellular coverage area.

* * * * *